(12) United States Patent
Kushnir et al.

(10) Patent No.: US 11,531,598 B2
(45) Date of Patent: *Dec. 20, 2022

(54) ON-THE-FLY PIT SELECTION IN CLOUD DISASTER RECOVERY

(71) Applicant: EMC IP Holding Company LLC, Hopkinton, MA (US)

(72) Inventors: Tomer Kushnir, Ramat Gan (IL); Jehuda Shemer, Kfar Saba (IL); Jawad Said, Kfar Yasif (IL); Kfir Wolfson, Beer Sheva (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 300 days.

This patent is subject to a terminal disclaimer.

(21) Appl. No.: 16/880,080

(22) Filed: May 21, 2020

(65) Prior Publication Data

US 2021/0365330 A1    Nov. 25, 2021

(51) Int. Cl.
*G06F 11/14* (2006.01)
(52) U.S. Cl.
CPC ...... *G06F 11/1469* (2013.01); *G06F 11/1484* (2013.01); *G06F 2201/815* (2013.01); *G06F 2201/84* (2013.01)
(58) Field of Classification Search
CPC ............. G06F 11/1469; G06F 11/1484; G06F 2201/815; G06F 2201/84

USPC ............................................................ 718/1
See application file for complete search history.

(56) References Cited

U.S. PATENT DOCUMENTS

| 11,068,356 B2* | 7/2021 | Agrawal ............. G06F 11/1461 |
| 2012/0017114 A1 | 1/2012 | Timashev et al. |
| 2015/0127612 A1 | 5/2015 | Balcha et al. |
| 2015/0143064 A1 | 5/2015 | Bhargava et al. |
| 2016/0048408 A1* | 2/2016 | Madhu .................. H04L 47/783 718/1 |
| 2018/0276085 A1 | 9/2018 | Mitkar et al. |
| 2018/0284986 A1* | 10/2018 | Bhagi ..................... G06F 3/065 |
| 2021/0255771 A1 | 8/2021 | Kilaru et al. |

OTHER PUBLICATIONS

International Search Report and Written Opinion received for PCT Patent Application PCT/US2021/029078, dated Aug. 12, 2021, 19 pages.

* cited by examiner

*Primary Examiner* — Joseph R Kudirka
(74) *Attorney, Agent, or Firm* — Workman Nydegger

(57) ABSTRACT

On-the-fly point-in-time recovery operations are disclosed. During a recovery operation, the PiT being restored can be changed on-the-fly or during the existing recovery operation without restarting the recovery process from the beginning. IN one example, this improves recovery time operation (RTO) and prevents aspects of the recovery operation to be avoided when changing to a different PiT.

20 Claims, 5 Drawing Sheets

ON-THE-FLY PIT SELECTION IN CLOUD DISASTER RECOVERY

FIELD OF THE INVENTION

Embodiments of the present invention generally relate to data protection and data protection operations. More particularly, at least some embodiments of the invention relate to systems, hardware, software, computer-readable media, and methods for data protection including point in time recovery operations.

BACKGROUND

Cloud storage providers include, for example, Amazon, Microsoft, and Google. The cloud storage available from these providers is becoming more ubiquitous and is used for various purposes. The storage may come in various flavors or tiers and allows data to be stored different. Storage types include, by way of example, object based storage and block based storage. Further, cloud providers often provide compute environments.

For example, cloud storage may be used for replication, backup and disaster recovery purposes. In fact, one reason for using cloud storage for data protection is to be able to recover data, failover, or the like. Some data protection systems offer point in time (PiT) recovery operations. A user may select a point in time and the system may recover the data (e.g., virtual machine/application/data) to selected point in time. If, however, the data recovered for that point in time is not the one that was actually needed, the entire recovery process is performed again for another selection.

This is a problem because the recovery process for certain data, such as virtual machines, can be quite lengthy. This is in part related to the fact that it is often necessary to perform a virtual machine conversion. For example, the virtual machine (or backup) is retrieved or accessed from storage and prepared to run on an appropriate hypervisor. The time needed to convert the virtual machine to run on the hypervisor is related to the size of the disks being imported or converted. For example, recovering a virtual machine with 5 Terabytes (TB) of total disk space may require, for example, from 16 to 36 hours. Selecting the wrong point in time may have a substantial and adverse impact on the customer and can significantly increase time needed to perform the recovery operation because the entire process must be started over from the beginning.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
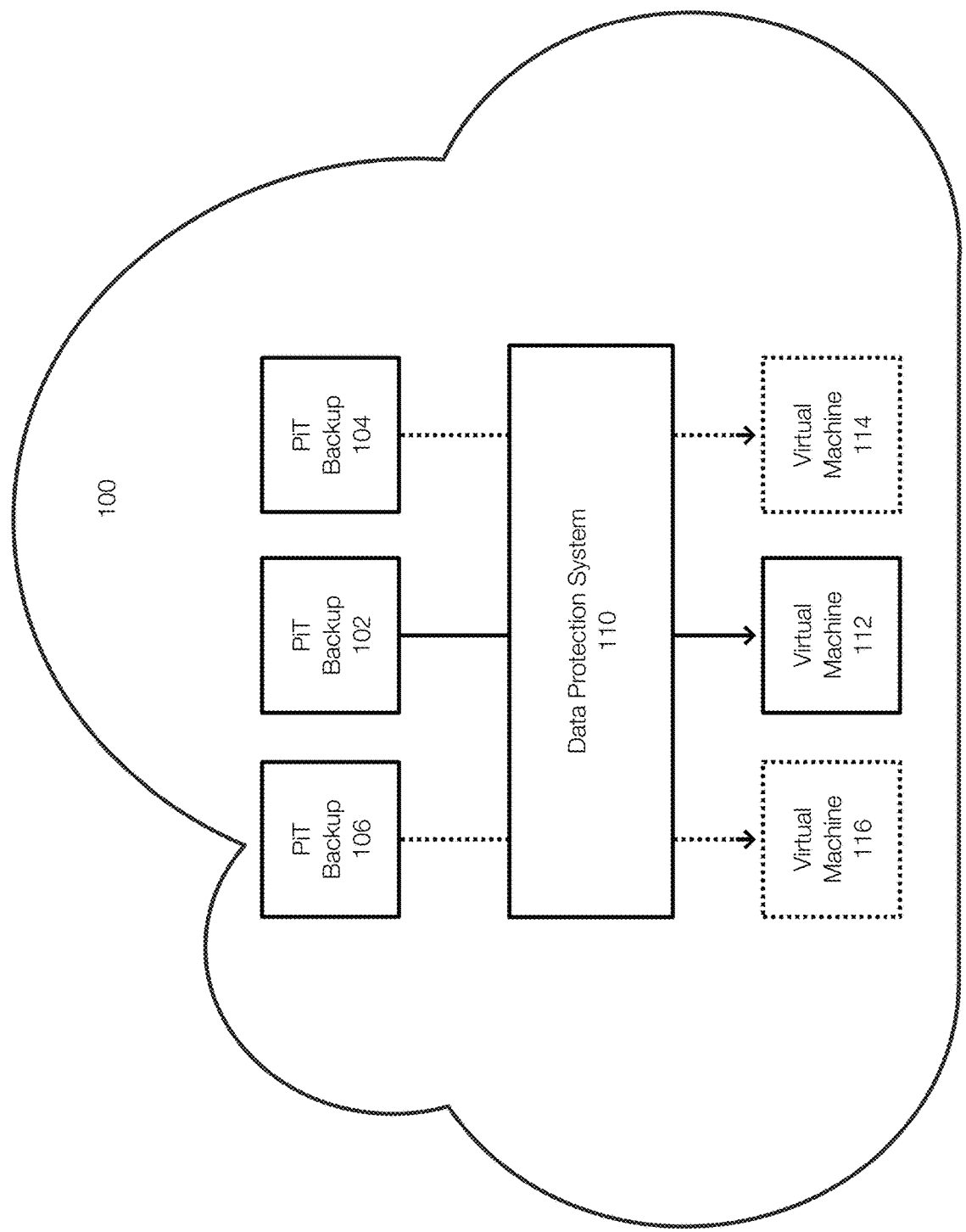
FIG. 1 discloses aspects of a data protection system configured to perform data protection operations including point in time recovery operations.

Embodiments of the present invention generally relate to data protection operations. More particularly, at least some embodiments of the invention relate to systems, hardware, software, computer-readable media, and methods for performing data protection operations including, but not limited to, recovery operations, point in time (PiT) recovery operations, backup operations, replication operations, disaster recovery operations, failover operations, point in time backup operations, cloud based data protection operations, and the like or combination thereof.

In general, example embodiments of the invention relate to performing a cloud-based recovery operation. More particularly, embodiments of the invention relate to cloud-based recovery operations including point in time recovery operations for virtual machines or applications running on virtual machines. Embodiments of the invention further relate to on-the-fly PiT recovery operations where the PiT can be changed on-the-fly or within the context of the current recovery operation.

Generally, cloud recovery operations required a user to select the exact point in time to recover to. The specific point in time is identified in advance of the recovery operations. As previously stated, once the PiT is selected, moving to an earlier or to a later PiT conventionally requires a separate recovery flow or operation. Cloud RTO (Recovery Time Objective) for recovery operation typically include the time associated with disk or volume hydration and virtual machine conversion. Once the virtual machine has been converted (a process that can take hours), a customer may discover that the PiT used for the recovery operation is the wrong one—an earlier or later PiT should have been selected. Conventionally, the entire process—including the hydration and virtual machine conversion—would need to be performed again for the newly selected PiT. This increases the RTO substantially.

As discussed herein, embodiments of the invention may include processes of attaching/detaching or mount/unmounting. By way of example and not limitation, attaching/detaching may refer to devices such as physical or virtual drives and mount/unmounting may refer to file systems.

Embodiments of the invention enable a customer to move forward and backward in time on-the-fly without running a completely new recovery operation. Aspects of the recovery operations, such as virtual machine conversion, can be omitted when the originally selected PiT turns out to be the wrong one. Embodiments of the invention improve the capabilities and efficiencies of the recovery operation in the cloud and allows users to recovery to the correct or accurate PiT faster and more efficiently.

The following discussing references, for example, cloud storage. Embodiments of the invention, however, are not limited to any particular cloud-based storage or format. Embodiments of the invention may also be implemented in Dell EMC Cloud Services or Dell EMC Cloud DR or other cloud replication applications. Further, embodiments of the invention may refer to different storage configurations or types.

Embodiments of the invention may be implemented in many different cloud environments and is not limited to any particular format or type. For discussion purposes, embodiments of the invention may reference AWS (Amazon Web Services) that includes S3 (Simple Storage Services) and EC2 (Elastic Cloud Compute) services. S3 is an object based storage and an EC2 instance may be a virtual machine.

Backups or snapshots of virtual machines may be stored in object storage in small segments that, when combined, create the virtual machine disks. A data protection system such as Dell EMC Could DR may use 4 MB segments. As a result, a 4 GB volume may have about 1000 4 MB segments.

Replicas or backups can be stored in various forms including snapshots. When storing multiple snapshots (multiple points in time), there is no need to store all of the segments of a volume in each snapshot or each PiT backup. Generally, a base image snapshot has all of the segments of the volume or volumes. Subsequent snapshots only have that segments whose data has changed since the previous snapshot. Depending on the rate at which snapshots are taken, this is often a very small percentage of segments.

Generally, the recovery process or disaster recovery process in the cloud often begins by hydrating the virtual machine. Hydration is a process of combining the segments of the PiT backups in the correct order in order to reconstruct the volume as the volume existed at the selected PiT backup.

As previously stated, the PiT backups may be stored in an object storage such as S3. During the recovery process, data stored in the object storage may be moved to a block storage device or other storage format or type. In one example, the data being recovered are written to a device or storage that is configured for use with virtual machines. Amazon EBS (Elastic Block Store) is storage for the drives of virtual machines. The segments are retrieved or downloaded from the object storage (e.g., S3) and placed in the correct locations on the block volume such as an EBS volume. Multiple segments can be downloaded and written in parallel. This type of hydration is performed for each volume of the virtual machine separately in one example.

A virtual machine conversion is performed. For example, an ec2 import-image command may be used. The cloud system (e.g., AWS) may take a full copy of the virtual machine from the object storage and prepare the operating system of the virtual machine to run in a cloud hypervisor (e.g., AWS hypervisor) in the context of cloud services. This may include adding/removing device drivers, removing virtual machine tools, setting configurations, and the like. Often, this conversion procedure is specific to the hypervisor and OS used. In one instance, the virtual machine conversion is a service provided by the cloud provider. Typically, the conversion may take time that is related to the size of the disks that are imported.

Embodiments of the invention can reduce the RTO of this process. For example, the virtual machine being converted may have more than one hard disk that requires conversion. In one example, the virtual machine may have an OS disk containing the operating system and data disks that contain the application data. The application executable can reside on the OS disk or the data disks.

The RTO can be improved by performing, in parallel, the conversion for the OS disk and the rehydration of the data disks. After both the conversion (e.g., to an EC2 instance) and the hydration of the data (e.g., from S3 storage to an EBS volume) are completed, the hydrated volume can be attached to the converted virtual machine instance.

Embodiments of the invention relate to recovering to a selected PiT with the ability to change the recovery PiT to an earlier or later PiT without having to perform a separate recovery operation from the beginning. The change can be performed on-the-fly. Before discussing the recovery operation in more detail, embodiments of the invention may include the following aspects. First, the conversion of the virtual machine typically makes changes to the operating system. Application data is not as affected because the data may not be platform dependent. Next, many virtual machines have a separate OS disk. In addition, virtual machines can be reconfigured or built such that the OS disk is separate from other disks.

Next, disks such as data disks can be attached/detached to/from a virtual machine and moved between virtual machines. In addition, going to a later PiT once a virtual machine has been converted includes applying the next PiT data segments on the data disks. Going to a previous PiT includes identifying the segments that were changed and applying the latest data written before the previous PiT. Finally, the OS can keep running and the application can be restarted to use the new data residing on the updated data disks while changing the PiT on-the-fly. Embodiments of the invention allow a different PiT to be recovered using the virtual machine that has already been converted. Generally, the data disks are detached from the recovered virtual machine, updated from the PiT backups to the appropriate PiT, and then reconnected to the recovered virtual machine.

FIG. 1 illustrates an example computing system in which recovery operations may be performed. In this example, at least a portion of the data protection system 110 is cloud based and operates in the cloud (e.g., one or more datacenters) 100. Thus, the PiT backups may be stored in cloud storage. As previously indicated, the PiT backups may be stored in object based storage. The virtual machines or other devices, appliances, servers, etc., recovered from the PiT backups may also operate in the cloud 100. The cloud includes the hardware (processors, memory, network equipment) needed to store data (objects, segments, blocks, etc.) and run applications, containers, virtual machines, or the like. In addition, aspects of the computing system shown in FIG. 1 may be virtualized.

The data protection system 110 may include an appliance, server (physical, virtual, etc.) that is configured to perform data protection operations. The data protection system 110 may be configured to replicate or backup data (e.g., virtual machines/applications/application data) from a production site to a replica site. FIG. 1 illustrates at least a portion of a replica site where PiT backups have been stored and can be used for recovery operations, disaster recovery operations, and the like.

The data protection system 110 may also include a server/appliance at the production site (which may be an on-premise system or a cloud-based system) that coordinates with the data protection system 110 to perform data protection operations.

FIG. 1 illustrates a series of PiT backups 102, 104, and 106 that are related in time. This series of backups may include fewer or more backups. In addition, at least one of the PiT backups is a base backup that contains a full set of the production data at some point in time. Other backups may be incremental backups. The backups may be snapshots.

In this example, a recovery operation is being performed. FIG. 1 illustrates an example of restoring or recovering a virtual machine in the cloud. However, the PiT backup may correspond to multiple virtual machines, volumes, consistency groups, or other data.

The PiT backup 102 may be used to recover the virtual machine 112. Similarly, the PiT backup 104 can be used to recover the virtual machine 114, which may be at a later point in time than the virtual machine 112. The PiT backup 106 can be used to recover the virtual machine 116, which is at an earlier time than the virtual machine 112. Thus, the virtual machines, 112, 114, and 116 are the same virtual machines at different points in time in this example.

If a process to recover the virtual machine 112 from the PiT backup 102 is performed, embodiments of the invention allow an earlier virtual machine 116 or a later virtual machine 114 to be recovered without starting a new recovery operation from the beginning. Embodiments of the invention allow the recovery operation to allow the selected PiT to be moved to a new PiT, such as the PiT backup 106 or the PiT backup 104.

Figure 2:
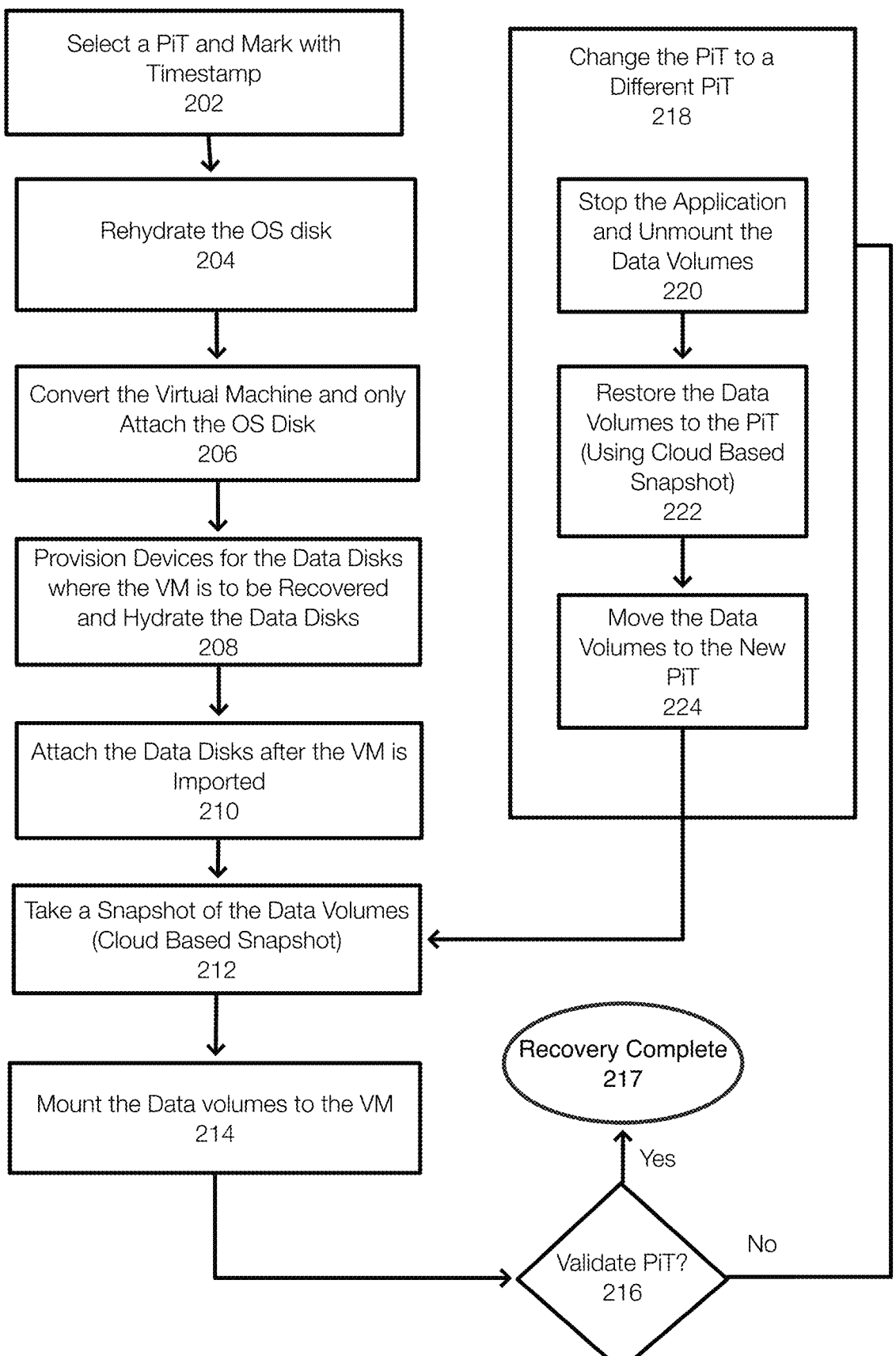
FIG. 2 illustrates an example of a method for performing a data protection operation including a point in time recovery operation.

FIG. 2 illustrates an example of recovering a virtual machine to a desired PiT while allowing the user to move to a different PiT without starting over. Embodiments of the invention can adapt the recovery operation to aspects that have already been performed, such as the virtual machine conversion.

In one example of a recovery operation, a PiT is selected 202. A PiT may be selected from a list of backups or snapshots. The selected PiT is marked with a timestamp, such as timestamp N. Snapshots or PiTs that occurred before or after the selected PiT may be referenced as or associated with timestamps . . . N−2, N−1, N+1, N+2 . . . .

After the PiT is selected, the OS disk is rehydrated 204. The hydration may occur in the same storage in which the data is stored or backed up (e.g., in the object storage or S3). Next, the virtual machine is converted 206 (e.g., using an import command) and the OS disk is attached to the converted virtual machine. The conversion may import an image of the virtual machine from the selected PiT to a compute environment. In one example, only the OS disk is attached. For Linux based OSes, other disks in fstab may be marked as optional/nofail.

The conversion, as previously stated, may include taking the full copy or image of the virtual machine from storage (e.g., S3) and preparing the imported virtual machine to run on a hypervisor (e.g., AWS hypervisor). This may include adding/removing device drivers, set configurations, and the like.

At the same time, devices for all of the data disks are prepared or provisioned 208 in the region where the virtual machine is to be recovered. In other words, the data disks are rehydrated directly into these devices (e.g., EBS devices) and the hydration can be done with high parallelism. After the data disks are hydrated and the virtual machine is imported or converted, the data disks or devices are attached 210 to the converted virtual machine.

Next, a cloud-based snapshot of the volumes attached to the converted virtual machine is performed (e.g., an AWS snapshot) at 212. This snapshot is distinct from cloud-based disaster recovery snapshots (the PiT backups or snapshots) that are saved in the storage. This snapshot of the data volumes that are attached to the converted virtual machine may be used to move back to timestamp N if necessary and when moving to another PiT on-the-fly.

The data volumes are attached 214 to the virtual machine and this results in a virtual machine that has been recovered to at timestamp N. The user may then validate 216 the recovered virtual machine at the selected PiT. If the validation is correct, the recovery may be complete 217. However, the recovered virtual machine at 214 and 216 may not be correct (e.g., contains the wrong files, wrong version of data). For example, the user may determine whether the correct data has been recovered to the PiT recovered virtual machine.

In the event that there is a need to change the selected PiT to a previous or later PiT, the PiT is changed 218 to another PiT. A user may decide that the wrong PiT has been recovered and may select or identify a different PiT from the PiT backups. Changing the PiT may include stopping the application and detaching 220 the data volumes (or data disks) from the converted virtual machine and from the OS. The data volumes that have been detached are restored 222 to the PiT N using the snapshot N taken at 212. As previously stated, the snapshot N taken at 212 refers to the cloud-based snapshot performed on the recovery virtual machine after the virtual machine has been converted and the data disks have been attached to the recovery virtual machine. The PiT is then moved (by reading data from the PiT backups and writing to the volumes) 224 forward or backwards to a different PiT such as N−k or N+k. The newly selected PiT is marked k and the flow returns to element 212 where a cloud-based snapshot is again taken of the volume at the newly selected PiT. The time N is set equal to K and a new snapshot is taken of the volume. Thus, the newly selected PiT is associated with a timestamp N that allows subsequent moves to earlier or later PiTs in the event that the recovered PiT is again incorrect. This allows a user to repeatedly select different PiTs if necessary.

Figure 3:
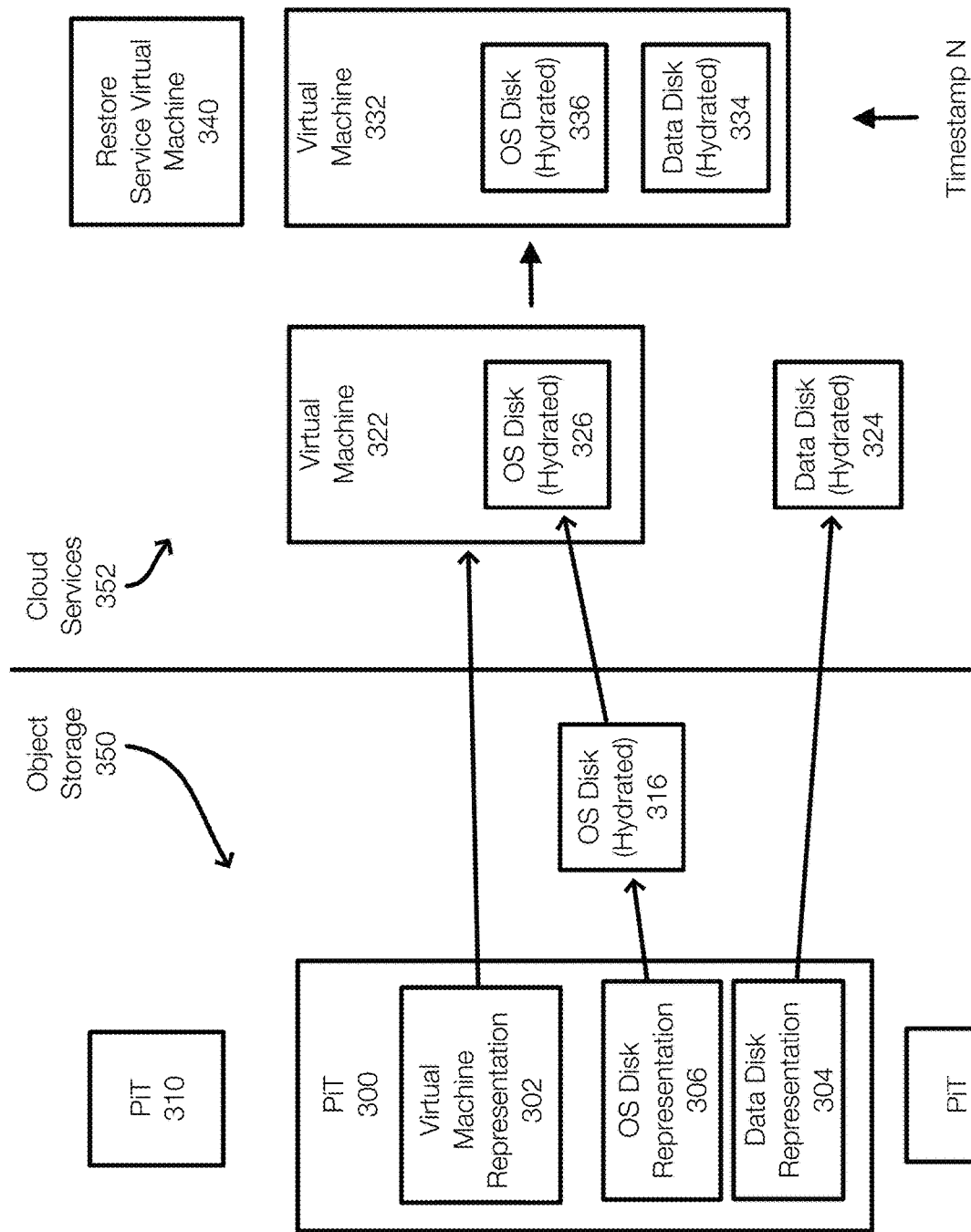
FIG. 3 illustrates an example of performing a recovery operation in a computing environment such as a cloud-based computing environment.

FIG. 3 illustrates a block diagram that includes a data protection system configured to restore a PiT backup and that allows the selected and in-process-of-recovery PiT to be moved to a different PiT. FIG. 3 illustrates backups including PiT 310, PiT 300 and PiT 308. The PiT 310 is earlier in time than the PiT 300 and the PiT 308 is later in time than PiT 300. The PiT 300 includes a virtual machine representation 302 (e.g., virtual machine configuration data) that may include or is associated with an OS disk representation 306 and a data disk representation 304. The virtual machine representation 302 may also include an application representation. These representations contain sufficient information for a virtual machine to be recovered. The format of these representations may differ from the restored or recovered virtual machine. For example, the virtual machine representation 302 may be in object storage and may be recovered to block storage.

In this example, the virtual machines 322 and 332 represent the same virtual machine at different times of the recovery operation and are recovered from the virtual machine representation 302, which is associated with the OS disk representation 306 and the data disk representation 304.

The PiT 300 is stored, by way of example only and not limitation, in object storage 350, which may be provided by a cloud provider or a datacenter.

The recovery operation may begin when the PiT 300 is selected for recovery, for example based on user input. After the PiT 300 is selected, the OS disk representation 306 is rehydrated in the object storage 350 as OS disk 316. At the same time or at a different time, the data disk representation 304, in the object storage, is rehydrated as the data disk 324 or volume in cloud services 352. In one example, the cloud services 352 may use a different memory or storage (e.g., block-based storage). In this example, the data disk 324 is hydrated in the region where the virtual machine will be recovered. Thus, the data disk 324 may be an EBS volume or device for example.

Next, the virtual machine is converted from the object storage 350 to the cloud services 352, which is an example of a cloud based environment in which computing is performed. The conversion may be achieved, by way of example only, by importing an image from the object storage 350 into the cloud services 352. After the virtual machine is converted to or imported as the virtual machine 322 and the data disk is hydrated as a device or volume in the cloud services 352, the data volume or disk 324 is attached. This results in a recovered or converted virtual machine 332 that includes an OS volume disk 336 and a data volume disk 334, which have been attached and mounted to the virtual machine 332. A volume may span multiple disks.

Next a snapshot the virtual machine 332 is taken and associated or identified as timestamp N. This allows the data protection system to move to a different PiT (e.g., the PiT 300 was incorrectly selected or the wrong PiT).

FIG. 3 also illustrates a restore service virtual machine 340. The restore service virtual machine 340 is used to move the disk (or volume) 334 to a new PiT. For example, an application running on the virtual machine 332 is stopped, the volume or disk 334 returned to its state at timestamp N and detached or unmounted from the restored virtual machine 332 (the OS remains running on the restored virtual machine 332), and the volume or disk 334 is attached to the restore service virtual machine 340. Data from the PiTs is then written as necessary to the volume or disk 334. Once the volume 334 is moved to the new PiT, the volume is detached from the restore service virtual machine 340, attached to the restored virtual machine 332. The application is restarted and the data is validated. If necessary, the volume is moved to yet another PiT.

Figure 4:
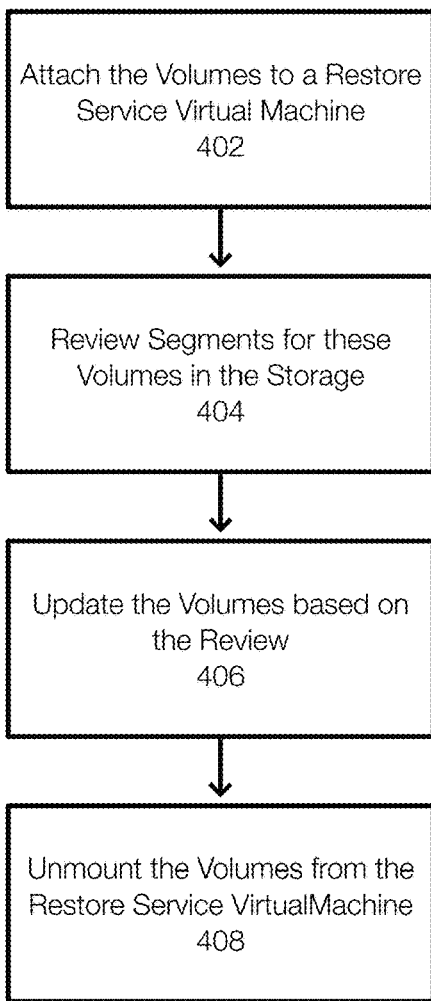
FIG. 4 illustrates an example of a method for performing a recovery operation and moving to a later point in time relative to a selected point in time without starting the recovery operation from the beginning.
Figure 6:
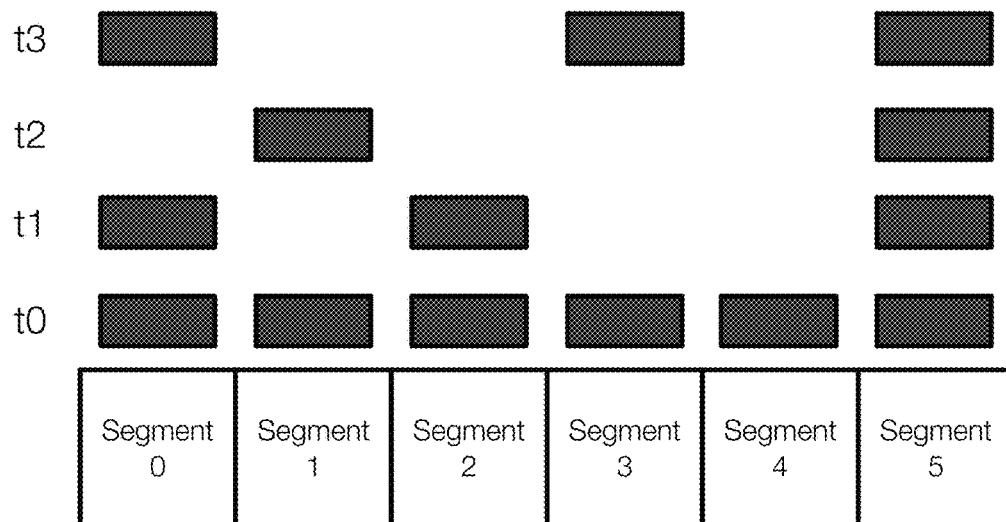
FIG. 6 illustrates an example of segments stored in multiple backups or snapshots.

FIG. 4 illustrates an example of a method for moving from a recovered virtual machine recovered from a PiT to another PiT. Embodiments of the invention shown in FIG. 4 relates to moving to a PiT that is later in time from the virtual machine 332 shown in FIG. 3. FIG. 4 illustrates an example where a user may want to move to a different PiT than the previously selected PiT. The discussion of FIG. 4 also references FIG. 6, which illustrates a series of PiT snapshots or backups and the state of segments at different times. More specifically, FIG. 6 illustrates segments that were written and backed at different times. For example, the snapshot at t2 includes changes to segments 1 and 5.

When moving to a different PiT after a decision has been made to move the virtual machine to another PiT, the volumes of the virtual machine are first restored to timestamp N using the cloud-based snapshot. Restoring to timestamp N is performed because changes to the data may have been made during validation and it may be necessary to restore the volume back to timestamp N, which is based on the cloud-based snapshot. In this example, the volume (or volumes) is attached 402 to a restore service virtual machine after being detached from the converted or recovered virtual machine. The restore service virtual machine is a temporary virtual machine whose purpose is to read segments from the object storage or from the PiT backups and write those segments to the volume being moved to a different PiT.

The restore service virtual machine reviews 404 the segments through all points in time or at least the points of time related to the original PiT and the desired PiT. More specifically, the new PiT may be N+m. Thus, the service virtual machine reviews all of the segments for the volume in the object storage and moves through all PiTs N+1 through N+m. Segments for the OS disk may be ignored.

Next, the volume being move to a different PiT is updated 406 based on the review. If a particular segment has changed more than once, only the most recent segment (the one closest to N+m needs to be written). Updating the volume or volumes to the new PiT can be done in a parallelized manner using many threads. Multiple restore service virtual machines may also be used—each processing a different volume or data disk.

The volumes are then detached and unmounted 408 from the restore service virtual machine and attached and mounted to the restored virtual machine.

For example, a user may recover to a PiT that has been associated with a timestamp N as shown in FIG. 3. After checking the recovered virtual machine, the user may decide to recover to PiT (N+m). Assume, for example, that t3 corresponds to timestamp N+m and t1 corresponds to timestamp N. After reverting the virtual machine or the volume of the virtual machine to PiT t1 (returning to timestamp N), the recovery operation moves the virtual machine from PiT t1 to PiT t3.

As shown in FIG. 6, there are four segments that have changed between t1 and t3: segments 0, 1, 3, and 5. Segments 1 and 5 were written in snapshot t2 and segments 0, 3, and 5 were written in snapshot t3. The recovery operation will review these segments in all of the relevant snapshots and apply the changes to the volumes that have been attached to the recovery service virtual machine.

Figure 5:
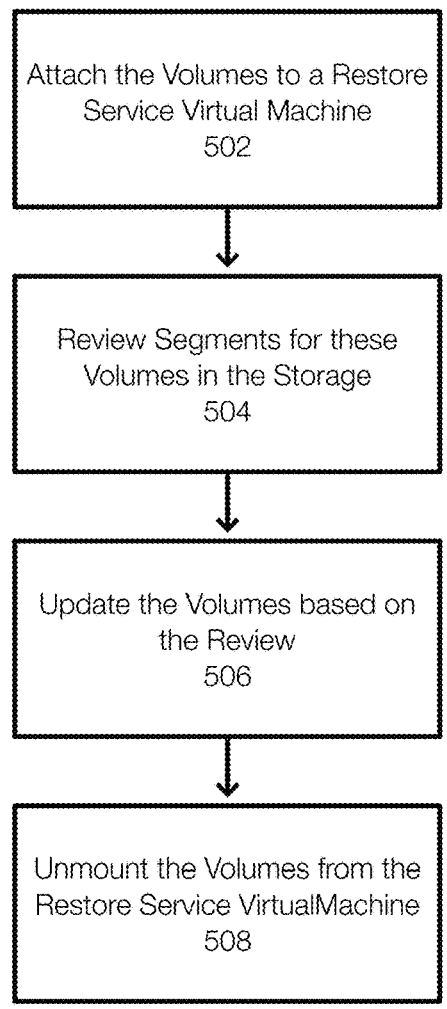
FIG. 5 illustrates an example of a method for performing a recovery operation and moving to an earlier point in time relative to a selected point in time without starting the recovery operation from the beginning.

FIG. 5 illustrates an example of moving backwards from a selected PiT to a previous PiT during a recovery operation. FIG. 5 also references FIG. 6. In FIG. 5, the volumes of the recovered virtual machine (at timestamp N) are attached 502 to a restore service virtual machine. The restore service virtual machine reviews 504 the segments in the storage or in the snapshots or volumes stored in the PiTs. When moving backwards, the restore service virtual machine reviews the segments through all points in time from PiT N−k+1 to PiT N (inclusive) to identify the locations of all data or segments that were written. This metadata identifies the dirty segments of the volumes or disks that need to be overwritten to reach PiT N−k. The restore service virtual machine will review the locations and search for the recent data segments which were written to before or on N−k at each location or segment.

The volumes are updated 506 based on this review. The OS disk or segments can be ignored. Finally, the volumes are detached unmounted 508 from the restore service virtual machine and attached and mounted to the recovered virtual machine.

More specifically and with reference to FIG. 6, assume that the user first recovered to PiT t3 (timestamp N in this example). The user decides to change the recovery image to t1 (N−k timestamp) on the fly. The segments that have changed between t1 and t3 are segments 0, 1, 3 and 5. The recovery operation moves over all PiTs between N−k+1 (t2) and N (t3). The changed segments can be listed or stored for processing. The segments that have changed are: t2—segments 1 and 5, t3—segments 0, 3 and 5. This can be united as a single list of segments 0, 1, 3, and 5

Next, the recovery operation (or the restore service virtual machine) takes, for each of these segments, the data from the snapshot which is less than or equal to t1 (earlier or on t1). These segments are used to overwrite the corresponding segments or locations on the volumes attached to the restore service virtual machine. Thus, the list of changed segments includes segments 0, 1, 3, and 5. The recovery operation writes segment 0 from t1, segments 1 and 3 from t0 and segment 5 from t1 in order to recover the volumes to PiT N−k or t1 from t3. In one example, the snapshots in the cloud always contain at least one full copy that has all of the data segments. In this example, snapshot t0 is a base snapshot.

Figure 7:
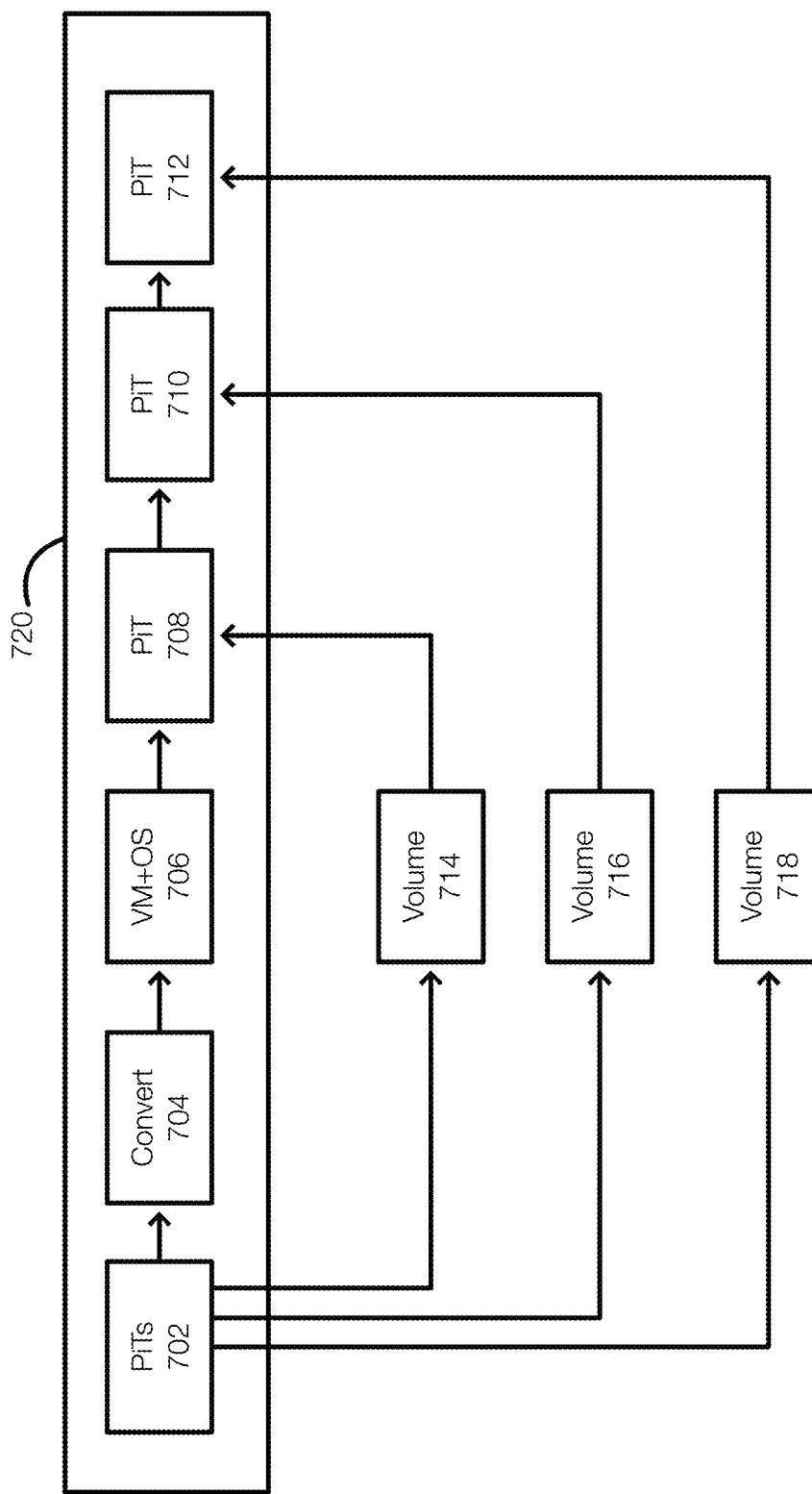
FIG. 7 illustrates an example of a recovery operation timeline that allows a user to move to a point in time that is different from an originally selected point in time on the fly or in the context of the same recovery operation.

FIG. 7 illustrates an example of performing a recovery operation and illustrates a recovery timeline. FIG. 7 illustrates a recovery operation 720 that recovers to a desired PiT. Advantageously, the recovery operation can recover to a first point in time and then recover to a second point in time without having to restart the recovery process and without having to convert the virtual machine a second time. FIG. 7 illustrates that PiTs 702 may be stored in storage. When a specific PiT is selected (e.g., PiT 708), the OS disk is hydrated and the virtual machine is converted 704 to result in a virtual machine with an OS 706. Thus, only the OS disk is converted in this example. At the same or similar time, the volume 714 corresponding to the PiT 708 from the PiTs 702 is hydrated and attached to the virtual machine after the virtual machine is converted and the volume 714 is hydrated.

Once the virtual machine and OS disk are converted and the data disk is hydrated, the PiT 708 (e.g., an operational virtual machine) is restored. If this is not the correct PiT, for example, based on a validation procedure the recovery operation 720 can then use other disks in the PiTs 702 to move the PiT 708 to the PiT 710. This may involve establishing the volume 716 from the volume 714 (which is returned if necessary to a state at timestamp N) using the data or segments stored in the PiTs 702. Similarly, the volume 718 can be updated based on the volume 716 (or the volume 714 in one example) and the PiT 712 can be generated from the using the same VM+OS 706 and attaching the hydrated volume 718.

The recovery operation 720 allows disks or volumes to be hydrated as necessary to other points in time, either before or after the PiT 708. As the virtual machine is moved from one PiT to another PiT, the OS keeps running, the disks or volumes are hydrated as needed and reattached and/or remounted. Then, the application is restarted when moving between points in time.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that the RTO of recovery operations can be improved and PiT backups can be moved to other PiTs during the recovery operation on-the-fly.

In general, embodiments of the invention may be implemented in connection with systems, software, and components, that individually and/or collectively implement, and/or cause the implementation of, data protection operations.

At least some embodiments of the invention provide for the implementation of the disclosed functionality in existing backup platforms, examples of which include the Dell-EMC Disaster Recovery systems and DELL EMC RecoverPoint for VMs. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, replicate, recover and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients, agents, modules, or servers that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks (object storage, block storage, file storage), replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method, comprising: selecting a point-in-time (PiT) to recover from a plurality of PiTs, converting an image of a virtual machine in the selected PiT to a converted virtual machine, attaching a hydrated operating system (OS) disk to the converted virtual machine, hydrating a data disk from the PiT as a volume and attaching the volume to the converted virtual machine, taking a snapshot of the volume, operating the converted virtual machine as a restored virtual machine and running an application on the restored virtual machine; and moving the volume to a second PiT included in the plurality of PiTs when the volume attached to the restored virtual machine is not validated without requiring a second conversion of a second image of a virtual machine.

Embodiment 2. The method of embodiment 1, further comprising stopping the application without stopping operation of the operating system, unmounting the volume, and restoring the volume to the snapshot taken of the volume.

Embodiment 3. The method of embodiments 1 and/or 2, further comprising selecting a second PiT from the plurality of PiTs, attaching the volume to a restore service virtual machine, reviewing segments for PiTs of the volume between the selected PiT and the second PiT, and updating the volume based on the review.

Embodiment 4. The method of embodiments 1, 2, and/or 3, further comprising detaching and/or unmounting the volume from the restore service virtual machine, attaching the volume to the restored virtual machine, and restarting the application on the restored virtual machine.

Embodiment 5. The method of embodiments 1, 2, 3, and/or 4, wherein the second PiT is later in time than the selected PiT.

Embodiment 6. The method of embodiments 1, 2, 3, 4, and/or 5, wherein the second PiT is earlier in time than the selected PiT.

Embodiment 7. The method of embodiments 1, 2, 3, 4, 5, and/or 6, further comprising, when the second PiT is later in time than the selected PiT, writing segments that are identified in reviewing the segments as changed to the volume, wherein only a latest change for a given segment is written to the volume.

Embodiment 8. The method of embodiments 1, 2, 3, 4, 5, 6, and/or 7, further comprising, when the second PiT is earlier in time than the selected PiT, identifying dirty segments that need to be overwritten and overwriting the dirty segments on the volume with most recent segments that were written to before or on the second PiT.

Embodiment 9. The method of embodiments 1, 2, 3, 4, 5, 6, 7, and/or 8, further comprising ignoring segments associated with the OS disk.

Embodiment 10. The method of embodiments 1, 2, 3, 4, 5, 6, 7, 8, and/or 9, wherein the PiTs are stored in a first storage comprising an object storage and wherein the restored virtual machine is in a compute environment associated with a different storage, wherein converting the image of the virtual machine includes at least preparing the restored virtual machine to operate on a hypervisor, setting configurations, and adding/removing drivers.

Embodiment 11. The method of embodiments 1, 2, 3, 4, 5, 6, 7, 8, 9, and/or 10, wherein the OS disk and the data disk are the same disk.

Embodiment 12. A method for performing any of the operations, methods, or processes, or any portion of any of these, disclosed herein.

Embodiment 13. A non-transitory storage medium having stored therein instructions that are executable by one or more hardware processors to perform the operations of any one or more of embodiments 1 through 12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device, one example of which is denoted at . As well, where any of the aforementioned elements comprise or consist of a virtual machine (VM), that VM may constitute a virtualization of any combination of the physical components disclosed herein.

The physical computing device may include a memory which may include one, some, or all, of random access memory (RAM), non-volatile random access memory (NVRAM) , read-only memory (ROM), and persistent memory, one or more hardware processors , non-transitory storage media , UI device , and data storage . One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
selecting a point-in-time (PiT) to recover from a plurality of PiTs;
converting an image of a virtual machine in the selected PiT to a converted virtual machine;
attaching a hydrated operating system (OS) disk to the converted virtual machine;
hydrating a data disk from the PiT as a volume and attaching the volume to the converted virtual machine;
taking a snapshot of the volume;
operating the converted virtual machine as a restored virtual machine and running an application on the restored virtual machine; and
moving the volume to a second PiT included in the plurality of PiTs when the volume attached to the restored virtual machine is not validated without requiring a second conversion of a second image of a virtual machine.

2. The method of claim 1, further comprising:
stopping the application without stopping operation of the hydrated operating system;
detaching the volume; and
restoring the volume to the snapshot taken of the volume.

3. The method of claim 2, further comprising:
selecting a second PiT from the plurality of PiTs;
attaching the volume to a restore service virtual machine;
reviewing segments for PiTs of the volume between the selected PiT and the second PiT; and
updating the volume based on the review.

4. The method of claim 3, further comprising detaching the volume from the restore service virtual machine, attaching the volume to the restored virtual machine, and restarting the application on the restored virtual machine.

5. The method of claim 3, wherein the second PiT is later in time than the selected PiT.

6. The method of claim 3, wherein the second PiT is earlier in time than the selected PiT.

7. The method of claim 3, further comprising, when the second PiT is later in time than the selected PiT, writing segments that are identified in reviewing the segments as changed to the volume, wherein only a latest change for a given segment is written to the volume.

8. The method of claim 3, further comprising, when the second PiT is earlier in time than the selected PiT, identifying dirty segments that need to be overwritten and overwriting the dirty segments on the volume with most recent segments that were written to before or on the second PiT.

9. The method of claim 3, further comprising ignoring segments associated with the OS disk.

10. The method of claim 3, wherein the PiTs are stored in a first storage comprising an object storage and wherein the restored virtual machine is in a compute environment associated with a different storage, wherein converting the image of the virtual machine includes at least preparing the restored virtual machine to operate on a hypervisor, setting configurations, and adding/removing drivers.

11. The method of claim 1, wherein the data disk and the OS disk are the same disk.

12. A non-transitory storage medium having stored therein instructions that are executable by one or more hardware processors to perform operations comprising:
selecting a point-in-time (PiT) to recover from a plurality of PiTs;
converting an image of a virtual machine in the selected PiT to a converted virtual machine;
attaching a hydrated operating system (OS) disk to the converted virtual machine;
hydrating a data disk from the PiT as a volume and attaching the volume to the converted virtual machine;
taking a snapshot of the volume;
operating the converted virtual machine as a restored virtual machine and running an application on the restored virtual machine; and
moving the volume to a second PiT included in the plurality of PiTs when the volume attached to the restored virtual machine is not validated without requiring a second conversion of a second image of a virtual machine.

13. The non-transitory storage medium of claim 12, the operations further comprising:
stopping the application without stopping operation of the hydrated operating system;
detaching the volume; and
restoring the volume to the snapshot taken of the volume.

14. The non-transitory storage medium of claim 13, the operations further comprising:
selecting a second PiT from the plurality of PiTs;
attaching the volume to a restore service virtual machine;
reviewing segments for PiTs of the volume between the selected PiT and the second PiT; and
updating the volume based on the review.

15. The non-transitory storage medium of claim 14, the operations further comprising detaching the volume from the restore service virtual machine, attaching the volume to the restored virtual machine, and restarting the application on the restored virtual machine.

16. The non-transitory storage medium of claim 14, wherein the second PiT is later in time than the selected PiT or wherein the second PiT is earlier in time than the selected PiT.

17. The non-transitory storage medium of claim 14, the operations further comprising, when the second PiT is later in time than the selected PiT, writing segments that are identified in reviewing the segments as changed to the volume, wherein only a latest change for a given segment is written to the volume.

18. The non-transitory storage medium of claim 14, the operations further comprising, when the second PiT is earlier in time than the selected PiT, identifying dirty segments that need to be overwritten and overwriting the dirty segments on the volume with most recent segments that were written to before or on the second PiT.

19. The non-transitory storage medium of claim 14, the operations further comprising ignoring segments associated with the OS disk.

20. The non-transitory storage medium of claim 14, wherein the OS disk and the data disk are the same disk.

* * * * *